US007617978B1

(12) United States Patent
Albrecht et al.

(10) Patent No.: US 7,617,978 B1
(45) Date of Patent: Nov. 17, 2009

(54) INTEGRATED BALLOT ASSEMBLY

(76) Inventors: Leonard N Albrecht, 599 N. Tercero Cir., Palm Springs, CA (US) 92262; Walter E Albrecht, 8849 Kenwood Rd., Cincinnati, OH (US) 45242

( * ) Notice: Subject to any disclaimer, the term of this patent is extended or adjusted under 35 U.S.C. 154(b) by 582 days.

(21) Appl. No.: 11/457,440

(22) Filed: Jul. 13, 2006

Related U.S. Application Data

(60) Provisional application No. 60/699,353, filed on Jul. 13, 2005.

(51) Int. Cl.
*G06K 17/00* (2006.01)
*G07C 13/00* (2006.01)

(52) U.S. Cl. ............................ 235/386; 235/51; 705/12

(58) Field of Classification Search .................. 235/51, 235/386; 705/12
See application file for complete search history.

(56) References Cited

U.S. PATENT DOCUMENTS

| | | | | |
|---|---|---|---|---|
| 1,404,611 | A | 1/1922 | Hoag | |
| 2,190,019 | A | 2/1940 | Foster | |
| 3,201,038 | A * | 8/1965 | Harris | 235/50 R |
| 3,294,424 | A | 12/1966 | Mathews | |
| 3,322,478 | A | 5/1967 | Brown | |
| 3,414,177 | A | 12/1968 | Spinner et al. | |
| 3,531,170 | A | 9/1970 | Boyer | |
| 3,677,453 | A | 7/1972 | Parks et al. | |
| 3,708,656 | A | 1/1973 | Fielder | |
| 3,944,788 | A | 3/1976 | Comisar et al. | |
| 4,485,298 | A * | 11/1984 | Stephens et al. | 235/50 R |
| 4,774,665 | A | 9/1988 | Webb | |
| 4,813,708 | A | 3/1989 | Narey | |
| 4,981,259 | A | 1/1991 | Ahmann | |
| 5,213,373 | A | 5/1993 | Ramos | |
| 5,610,383 | A | 3/1997 | Chumbley | |
| 6,457,643 | B1 * | 10/2002 | Way | 235/462.01 |
| 6,817,516 | B2 | 11/2004 | VonNida et al. | |
| 6,824,043 | B2 | 11/2004 | Navarro Jimenez | |
| 2003/0062408 | A1 | 4/2003 | Barmettler et al. | |

* cited by examiner

*Primary Examiner*—Michael G Lee
*Assistant Examiner*—Ali Sharifzada
(74) *Attorney, Agent, or Firm*—Myers Andras Sherman LLP; Joseph C. Andras

(57) ABSTRACT

An integrated ballot assembly formed from a backing assembly, a ballot book, and connection between the ballot book and the backing assembly. The backing assembly is formed from a planar support card and an integrally formed, co-planar ballot card that is temporarily secured to the planar support card along a perforation line. The ballot book is formed from several voting information sheets that are arranged from top to bottom in a stack of successively lower voting information sheets where each sheet is progressively narrower. The ballot card has progressively leftward moving voting columns, and the ballot book is connected to the planar support card with the right edges of its successively narrower sheets corresponding to and aligned with successive ones of the voting columns. When completed, the ballot card may be removed directly from the integrated ballot assembly along the first perforation line. Alternatively, the planar support card may include a second perforation line that divides the planar support card into a mounting portion and a covering portion. In such case, the covering portion and the ballot card may be removed from the overall assembly along the second perforation line, and the covering portion may be folded about the first perforation line to cover the ballot card.

27 Claims, 18 Drawing Sheets

INTEGRATED BALLOT ASSEMBLY

CROSS REFERENCE TO RELATED APPLICATIONS

This application claims the benefit of Provisional Application Ser. No. 60/699,353 filed on Jul. 13, 2005, entitled "SIMPLIFIED VOTING SYSTEM", which application is fully incorporated herein by reference.

BACKGROUND OF THE INVENTION

1. Field of the Invention

The invention relates generally to voting systems and, more specifically, to an integrated ballot assembly.

2. Discussion of Related Art

Over the years, various voting systems have been devised in order to present the available choices to the voter, to allow the voter to mark the ballot with his ore her vote, and to allow the voting administrators to read and tabulate the votes.

Voting systems generally provide each voter with a ballot that is used to record his or her choices. The ballot is often provided in the form of a ballot card that is marked in some fashion and suitable for machine reading.

Voting is often associated with governmental elections, but voting systems can be used in all variety of venues—from food selection to test taking. As a food selection example, a fast food restaurant could use a voting system to concisely present food and beverage options to its customers, and the customers could use the voting system to communicate their desired items without error. As a test example, schools often give so-called "multiple choice" tests where the students mark their choices on what is essentially a ballot card.

FIG. 1, for example, shows a ballot card 110*a* that has a number of voting response locations 111*a* that can be manipulated by the voter and then read by a machine (not shown). Here, the ballot card contains a plurality of numbered rows, each numbered row has five choices A, B, C, D and E, and the voter uses an ordinary pencil 115*a* to make a mark 112*a* in the desired voting response location 111*a*.

Any variety of shapes or indicia are possible. FIG. 2, for example, shows an alternative ballot card 110*b* wherein the voter makes marks 112*b* on the surface of the ballot card in voting response locations 111*b* that are circular, rather than rectangular.

FIG. 3 shows another ballot where the voter marks the ballot by using a stylus 115*c* to punch out a pre-perforated disk 111*c* and leave behind a machine readable aperture 112*c*.

In many voting systems, a short description of each choice is printed directly on the ballot card adjacent to a single-column of corresponding voting response locations that usually run along an edge of the voting card. The descriptions are usually terse (e.g. the candidates' names, the neutral title of a proposition, etc. . . . ) due to the limited amount of space on the ballot card. Sometimes the back side of the ballot card contains another set of descriptions adjacent to another column of voting response locations that run along the opposite edge of the ballot card. Because of the single-column nature of this system, voters are often provided with numerous ballot cards to accommodate all of the candidates and/or issues that are available for their consideration.

Various ballot systems have used separable or tear-off response cards, but they have generally been limited to just one or two voting columns.

U.S. Pat. No. 3,708,656 to Fielder, for example, discloses a system with a response card 12 and a tear-off section 14 that are separable via a perforation 20. Here, however, the response card has two voting columns. In particular, the response card 12 itself contains an information column 26 that is located next to a voting column 25 on the right edge of the response card 12. In addition, the tear-off section 14 contains an information column 28, and the response card 12 has another voting column 24 located adjacent to the tear-off section 14, along the perforation 20.

U.S. Pat. No. 6,457,643 to Way also discloses a ballot paper 1 with an option section 2 (with options presented in a random order) and a response section 3 that is separable from the option section 2 via a perforation 4. However, the option section 2 is a single sheet that can only carry a limited number of options, and the response section 3 only has a single column for voting.

Other ballot systems have been designed to work with ballots having three or more voting columns but all of the systems known to the inventor have been designed to work with a separate ballot card, and they have generally been overly complicated to manufacture and to use:

U.S. Pat. No. 3,201,038 to Harris discloses several embodiments. This patent relates historically to the "Vote-O-Matic" machines used in the 2000 presidential election in Florida. The embodiment of FIGS. 1-6 is comparable to the Stephens et al. device of U.S. Pat. No. 4,485,298 in that it features a plurality of hinged leaves 1 that are laterally spaced from one another at their hinged edges so that the user can vote in between the adjacent leaves. The embodiments of FIGS. 9-15 include a plurality of leaves (e.g. 40, 41, 43, and 43) that are each narrower than the one above it and that are attached to one another and to an apertured template sheet 2 by staples 44, or directly to the base 7. However, in all of the Harris embodiments, a ballot is held within a compartment in a large base, and the user has to push a stylus through a template and the base in order to punch the separate ballot that is located beneath the template and/or base.

U.S. Pat. No. 3,294,424 to Mathews discloses a voting system that is also designed for use with underlying ballot card ("tally sheet") 16. As shown, the system includes a plurality of vertically stacked cards 10, 12, 14 that are equal in size and bound to the underlying ballot card 16 with staples 20. Each of the stacked cards 10, 14, 14 include labeled columns of perforations (e.g. 24a, 24b, 24c, and 24d on card 10 and 26a, 26b, 26c, and 26d on card 12) that vary in lateral position. In use, the voter guides a stylus 33 through a perforation to punch out a corresponding element 27 of the ballot card 16. When the voter has completed the top card 10, he folds it out of the way as shown in FIG. 3, and then continues. The Mathews system allows for multiple columns, but is somewhat confusing because all of the lower cards must contain perforations that are there only to permit the stylus to pass all the way through to the ballot card 16 when making a choice indicated on an upper card.

U.S. Pat. No. 3,414,177 to Spinner et al. discloses another voting system that uses a plurality of equal sized information cards ("master information cards") 56 having offset perforations 100 which, as best explained at col. 3, lines 46-75, are used in succession and then dropped away in order to mark a single punch card 180.

U.S. Pat. No. 3,677,453 to Parks et al., for example, discloses a system that uses a plurality of equal-sized information cards 70a, 70b, 70c with columnar slots 72 that vary in lateral position for use in punching a ballot card 10 having a corresponding plurality of voting columns 12. As perhaps best disclosed at col. 4, lines 33-42, the Parks et al. system is complicated to use in that the voter must expose the lowermost information card 70a nearest the ballot card 10 by rotating all of the other information cards away from the ballot card 10, and then must completely tear away the first information card 70a in order to rotate the next information card 70b adjacent to the ballot card 10.

U.S. Pat. No. 4,485,298 to Stephens et al. discloses a vote recording apparatus 17 for marking a ballot 18 having multiple voting columns. The apparatus 17 includes a plurality of equal-sized "voting information leaves" 34 that are pivotally arranged like book pages that are laterally spaced apart from one another where they are hinged. A masking card 46 defines a pattern of available apertures within the vertical spacing between the voting information leaves. The '298 apparatus provides for multiple voting columns, but it is overly complicated and subject to potential misalignment.

It is desirable to allow a voter to study the issues and mark his or her ballot for mail-in purposes, or in advance of taking his or her ballot card to the polling place. It is desirable to enable the voter to keep a record of his or her votes. It is desirable to capture the voter's votes on a single card, rather than on several cards.

The known voting systems that use simple ballots made primarily of paper are cost effective, but do not permit a sufficient number of votes to be made on a single ballot card. The known voting systems that provide for voting within multiple columns are generally very complicated systems that require expensive and unwieldy apparatus to align voting information with separate ballot cards via templates and the like, are prone to error, and are generally unsuitable for use in both a physical polling situation and for or absentee voting by mail.

There remains a need for an integrated ballot assembly that is cost effective, simple to use, provides the voter with a record of his or her votes, and is suitable for both polling place and absentee voting. Such a ballot assembly may also have utility in other situations such as making food and beverage choices in a fast food restaurant.

SUMMARY OF THE INVENTION

In a preferred aspect, the invention resides in an integrated ballot assembly comprising a backing assembly, a ballot book, and a means for connecting the ballot book to the backing assembly. The backing assembly in this preferred embodiment comprises a planar support card; a machine-readable ballot card that is formed coplanar with the planar support card and that has a plurality of voting columns that are arranged from right to left in a sequence of successively leftward voting columns and that each contain a plurality of markable voting response locations; and a first perforated line that foldably and releasably connects the machine-readable ballot card to a right edge of the planar support card. The ballot book in this preferred embodiment comprises a plurality of voting information sheets that are arranged from top to bottom in a stack of successively lower voting information sheets, each voting information sheet having a left edge region, a right edge region, and a width. The preferred ballot book is a preassembled booklet that is efficiently printed in standard fashion and folded together, but the book could be easily formed from a plurality of separate sheets at the time of connecting. The means for connecting the ballot book to a top surface of the planar support card with its voter information sheets overlapping one another and the machine-readable ballot card is preferably a plurality of glue spots. The connecting means, of course, can be any other sort of suitable arrangement such as staples, clasps, bindings, etc. Each voting information sheet carries informative indicia that describes available voting options and corresponding ballot pointer indicia located at or near its right edge region, the width of the successively lower voting information sheets being successively narrower, each successively lower voting information sheet extending beyond the first perforated line and overlapping the machine-readable ballot card, the right edge region of each successively lower voting information sheet corresponding to and being aligned adjacent to a different and successively leftward one of the voting columns of the machine-readable ballot card, the ballot pointer indicia at or near the right edge of each successively lower voting information sheet visually correlating individual ones of the available voting options described by the informative indicia on that particular sheet with individual ones of the markable voting response locations in the corresponding voting column of the ballot card. The first perforated line holds the ballot card relative to the planar support card and thereby relative to the ballot book. The first perforated line also holds the ballot card's markable voting response locations in alignment with the ballot book's corresponding ballot pointer indicia during marking and releasing the ballot card for tabulation after marking.

These and other features and advantages of the invention will become more apparent with a description of preferred embodiments in reference to the associated drawings.

DESCRIPTION OF PREFERRED EMBODIMENTS

Most would regard it as desirable to include all a voter's choices on a single ballot card for reasons of efficiency in voting and subsequent processing. Nonetheless, many elections require multiple ballot cards.

Figure 4:
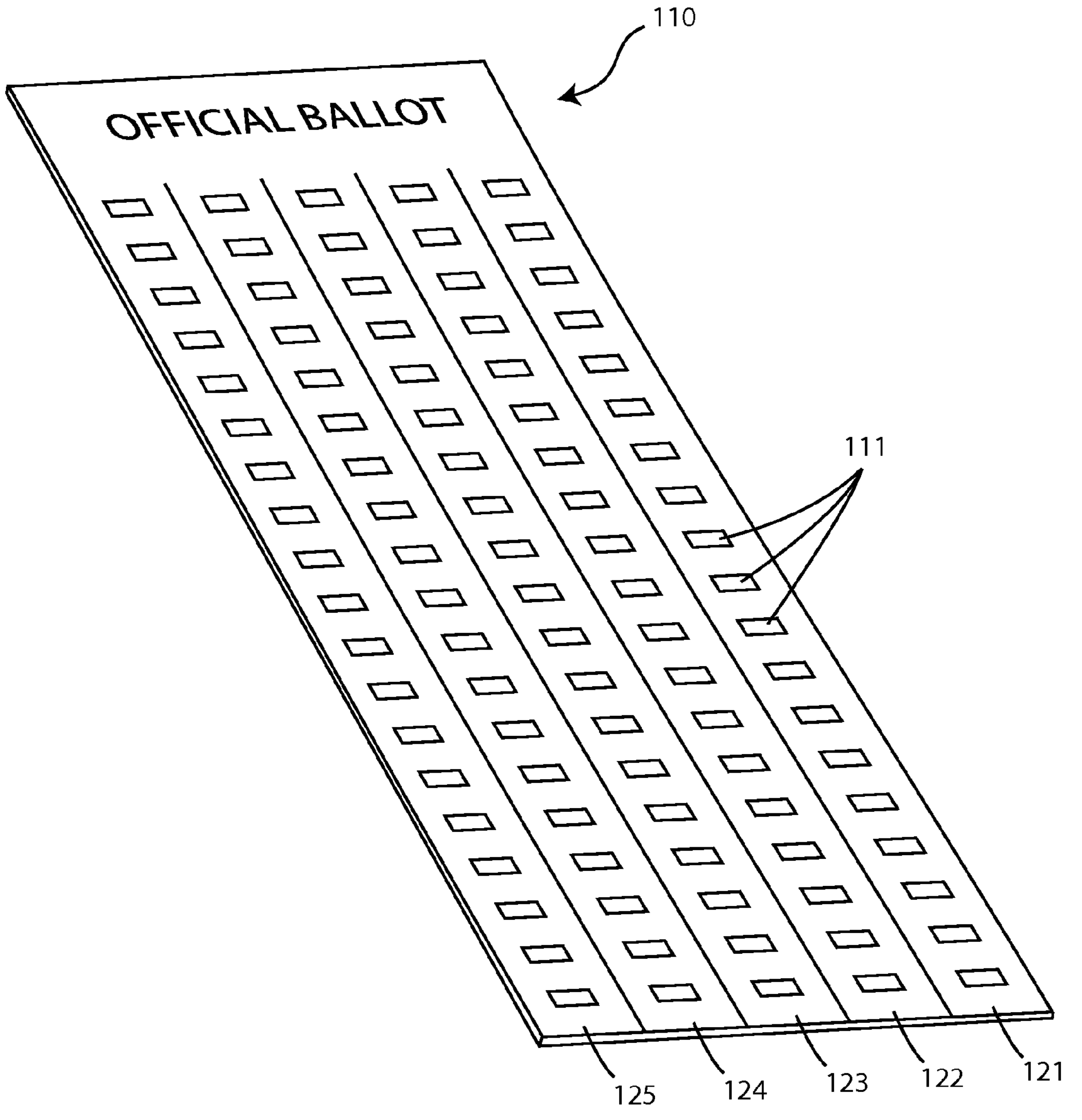
FIG. 4 shows an exemplary ballot card 110 that can be incorporated into an integrated ballot assembly made according to embodiments of the present invention, the ballot card 110 having multiple voting columns 121-125 that each contain a plurality of voting response locations 111.

FIG. 4 shows an exemplary ballot card 110 that can include a large number of choices and that be incorporated into an integrated ballot assembly made according to embodiments of the present invention. As shown, the ballot card 110 has multiple voting columns 121-125 that each contain a plurality of voting response locations 111. The exact format of the ballot card 110 will vary, usually according to the format required by the selected reading equipment. Scantron Corporation is an exemplary company that manufactures and sells the reading equipment and related forms.

Figure 5:
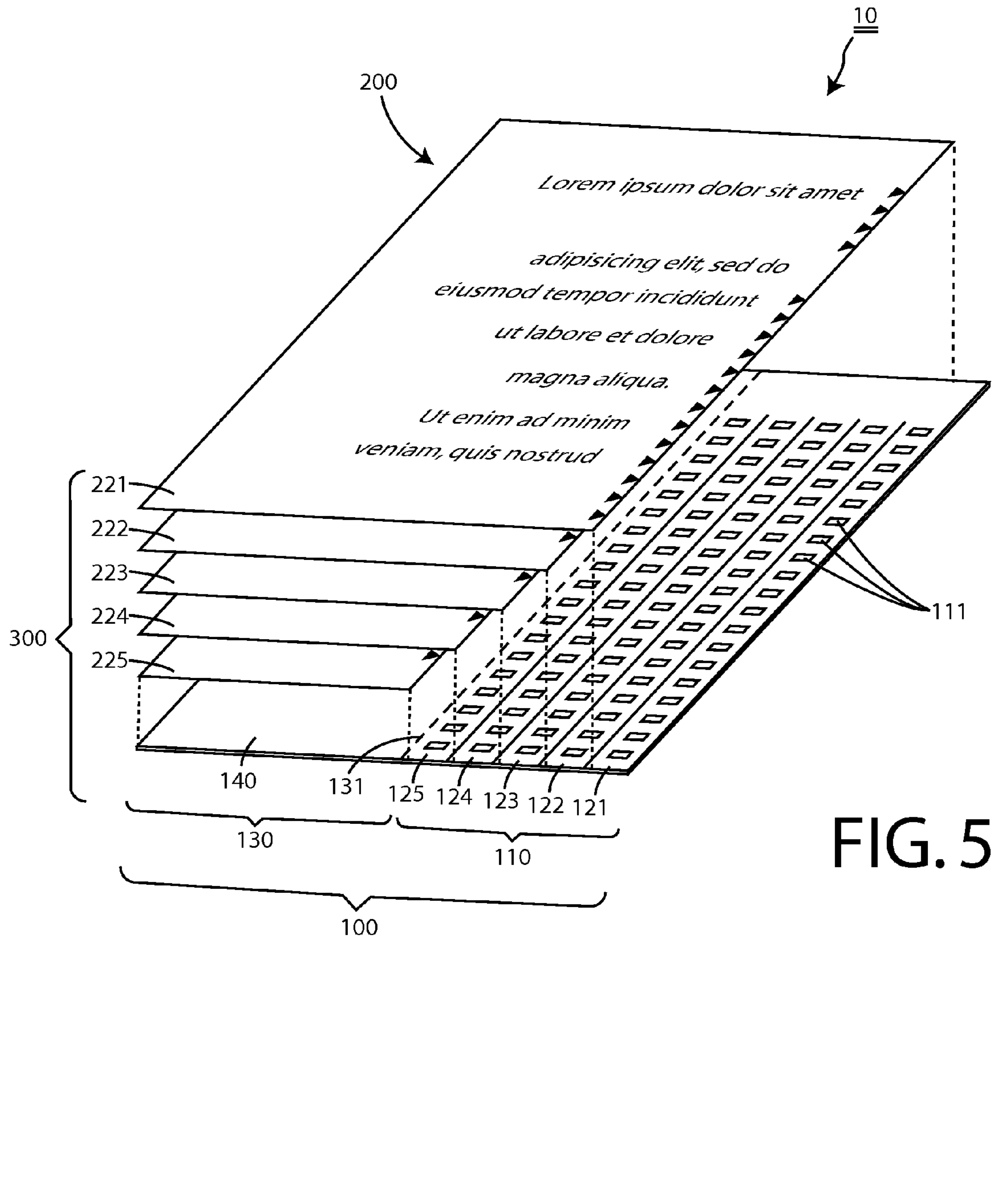
FIG. 5 is an exploded view (simplified) of a preferred embodiment integrated ballot assembly 10 formed from a backing assembly 100 that includes the machine-readable ballot card 110 and a planar support card 130 that includes a first perforated line 131 that defines a planar portion 140, a ballot book 200 containing a plurality of decreasingly narrow voting information sheets 221, 222, 223, 224, 225, and a means 300 for connecting the ballot book 200 to the planar support card 130.

FIG. 5 is an exploded and somewhat abstract view of an integrated ballot assembly 10 made according to a preferred embodiment of the invention. As shown, the integrated ballot assembly 10 comprises a backing assembly 100, a ballot book 200, and a means 300 for connecting the ballot book 200 to the backing assembly 100. The preferred connecting means 300, as discussed in more detail below, is binding glue, but the connecting means can comprise any other sort of suitable arrangement such as staples, clasps, bindings, etc.

Continuing to Focus on the embodiment of FIG. 5, one sees that the backing assembly 100 includes a planar support card 130 that defines a planar portion 140, and a co-planar, machine-readable ballot card 110 connected thereto by a first perforated line 131. In the preferred embodiment, the backing assembly 100 is made from a stock that is thick enough to provide the ballot card 110 with the same desired thickness. Also, of particular note, the ballot book 200 is formed from a plurality of voting information sheets 221, 222, 223, 224, 225 that are arranged, from top to bottom, in a stack of successively lower sheets. In the preferred embodiment, the voting information sheets 221-225 are formed from a lower weight paper to reduce bulk and cost. Each voting information sheet has a left edge region, a right edge region, and a width. Each voting information sheet 221-225 also contains informative indicia (e.g. "Lorem ipsum dolor sit amet") and corresponding ballot pointer indicia (e.g. the arrows) located at or near its right edge region. And, as shown, the width of each successively lower voting information sheet 221-225 is varied to make each sheet is successively narrower than its immediately upper neighbor.

The preferred ballot pointer indicia can be printed on the voting information sheet (as with the arrows), but can also be provided in other formats, such as by providing apertures located at or near the right edge region of each voting information sheet. In such case, the right edge portion of each voting information sheet would slightly overlap the ballot card's corresponding voting column 221-225 and associated voting response locations 111.

Through this arrangement, and by extending each successively lower voting information sheet 221-225 beyond the first perforated line 131, each of the sheets has its right edge portion overlapping that portion of the backing assembly 100 that forms the machine-readable ballot card 110. And, more particularly, the right edge region of each successively lower voting information sheet 221-225 corresponds to and is aligned adjacent to a different and successively leftward one of the voting columns 121-125 of the ballot card 100. As a result, the ballot pointer indicia (e.g. the arrows) that are located at or near the right edge of each sheet 221-225 visually correlate to individual ones of the voting options described by the informative indicia on each sheet with voting response locations 111 in corresponding voting columns 121-125 of the ballot card 110.

Figure 6:
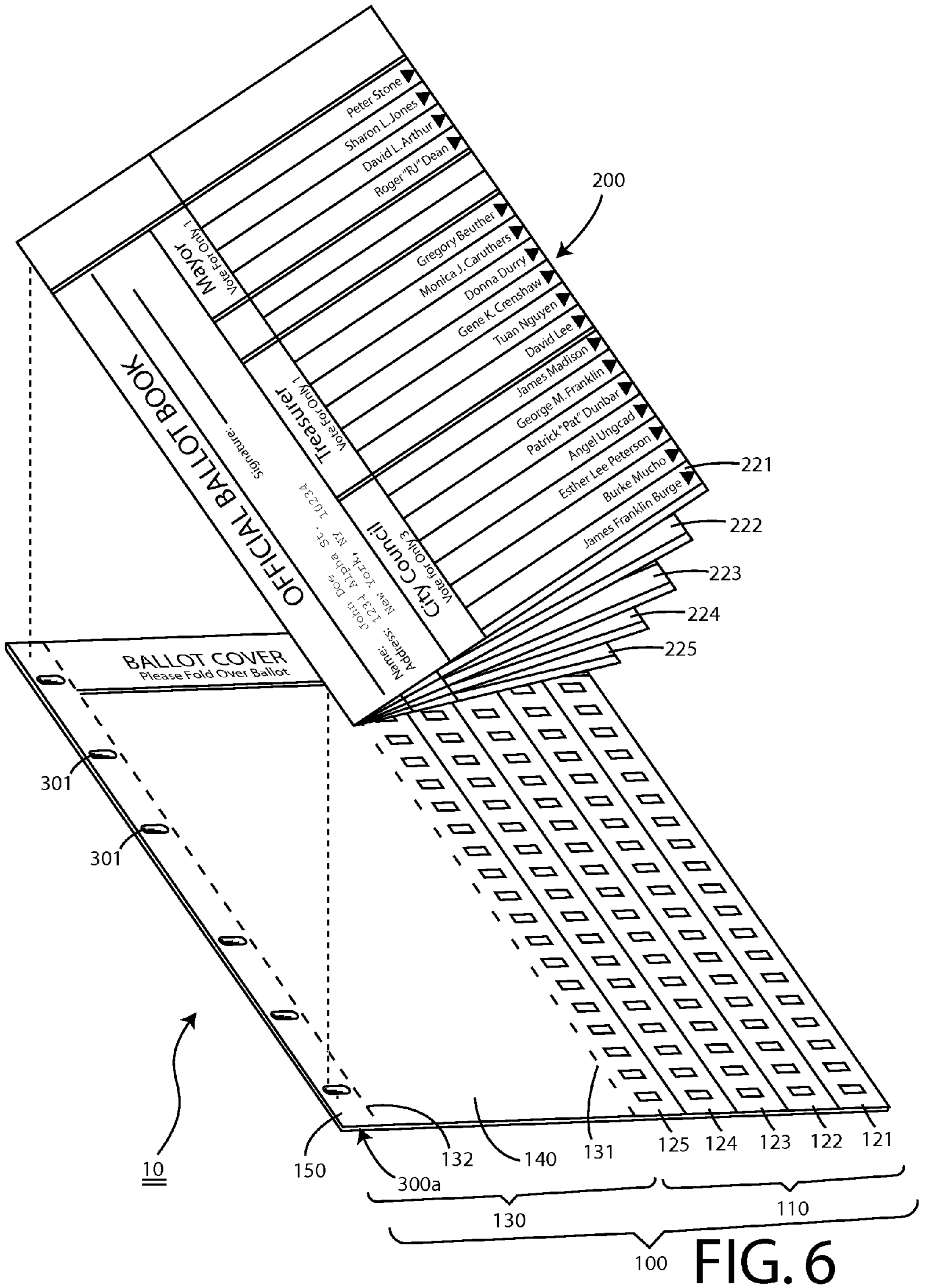
FIG. 6 is an exploded view (more detailed) of the preferred integrated ballot assembly 10 wherein the voting information sheets are provided in a preassembled booklet 200, wherein the illustrated connecting means 300*a* is a plurality of glue spots 301, and wherein the backing assembly 100's planar support card 130 includes a second perforated line 132 that, in conjunction with the first perforated line 131, defines a covering portion 140 and a mounting portion 150.
Figure 7:
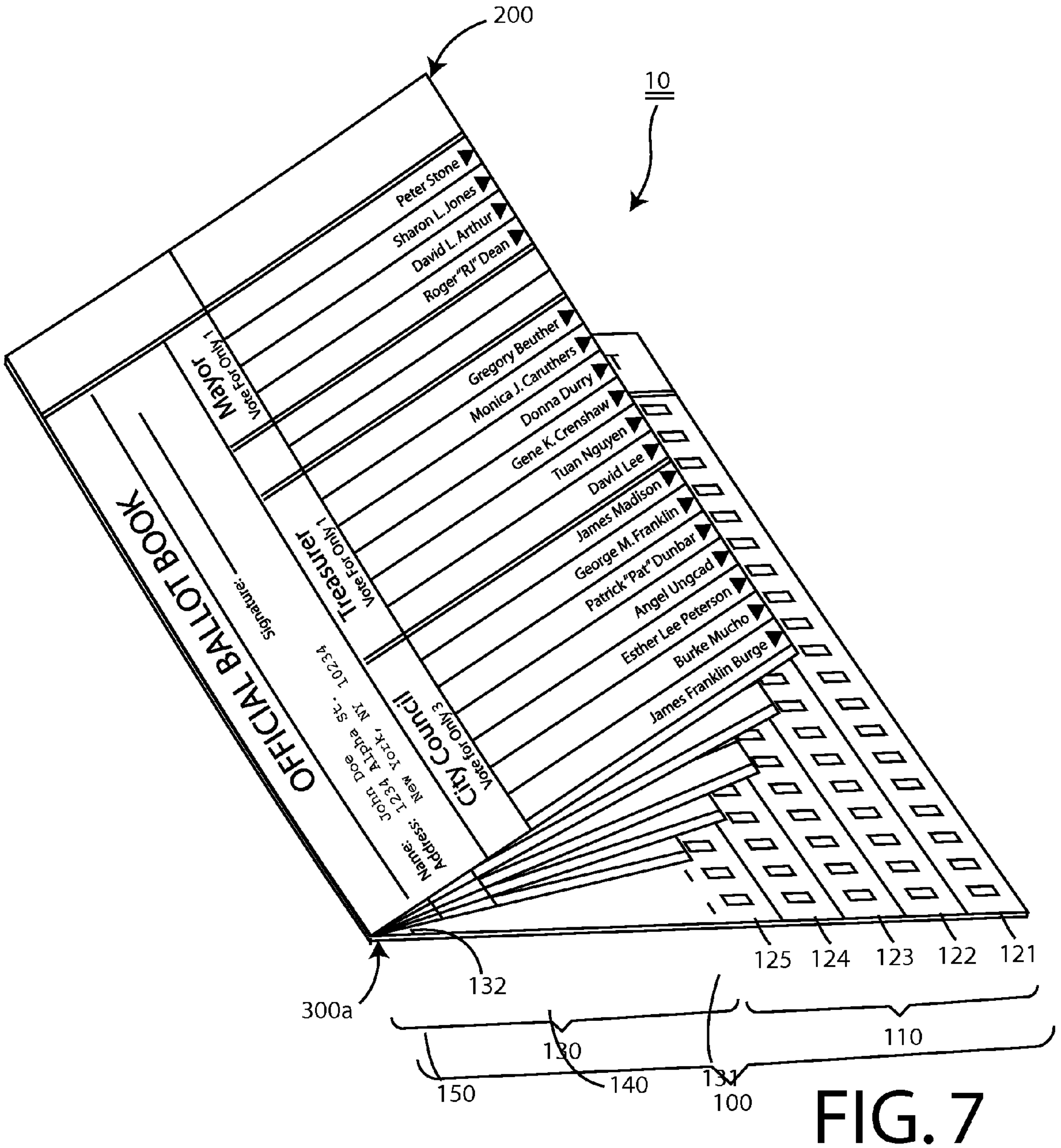
FIG. 7 is a fully-assembled perspective view of the integrated ballot assembly 10 of FIG. 6.

FIGS. 6 and 7 are best viewed together. They illustrate the integrated ballot assembly 10 with the voting options described by the informative indicia corresponding to a fictitious governmental election. In particular, FIG. 6 is an exploded view and more detailed presentation of the preferred integrated ballot assembly 10 wherein the voting information sheets are provided in a preassembled booklet 200. And, FIG. 7 is a fully-assembled perspective view of the integrated ballot assembly 10 of FIG. 6.

As best shown in FIG. 6, the illustrated connecting means **300*a* is a plurality of glue spots 301 that are applied to the backing assembly 100**. As already noted, other suitable connecting means may be used within the scope and spirit of the present invention.

The illustrated embodiment of FIGS. 6 and 7 adds other details to the preferred integrated ballot assembly 10. In particular, in addition to the first perforated line 131, the backing assembly 100's planar support card 130 also includes a second perforated line 132 that, in conjunction with the first perforated line 131, defines two portions: (1) a covering portion 140 and (2) a mounting portion 150. As is evident from FIG. 6, the ballot book 200 is mounted to a top surface of the mounting portion 150 that is defined to the left of the second perforated line 132. The covering portion 140, which may be separated along with the ballot card 110 if desired, and, as explained more fully below, is used to cover the voter's choices until removed by an appropriate official.

Figure 8:
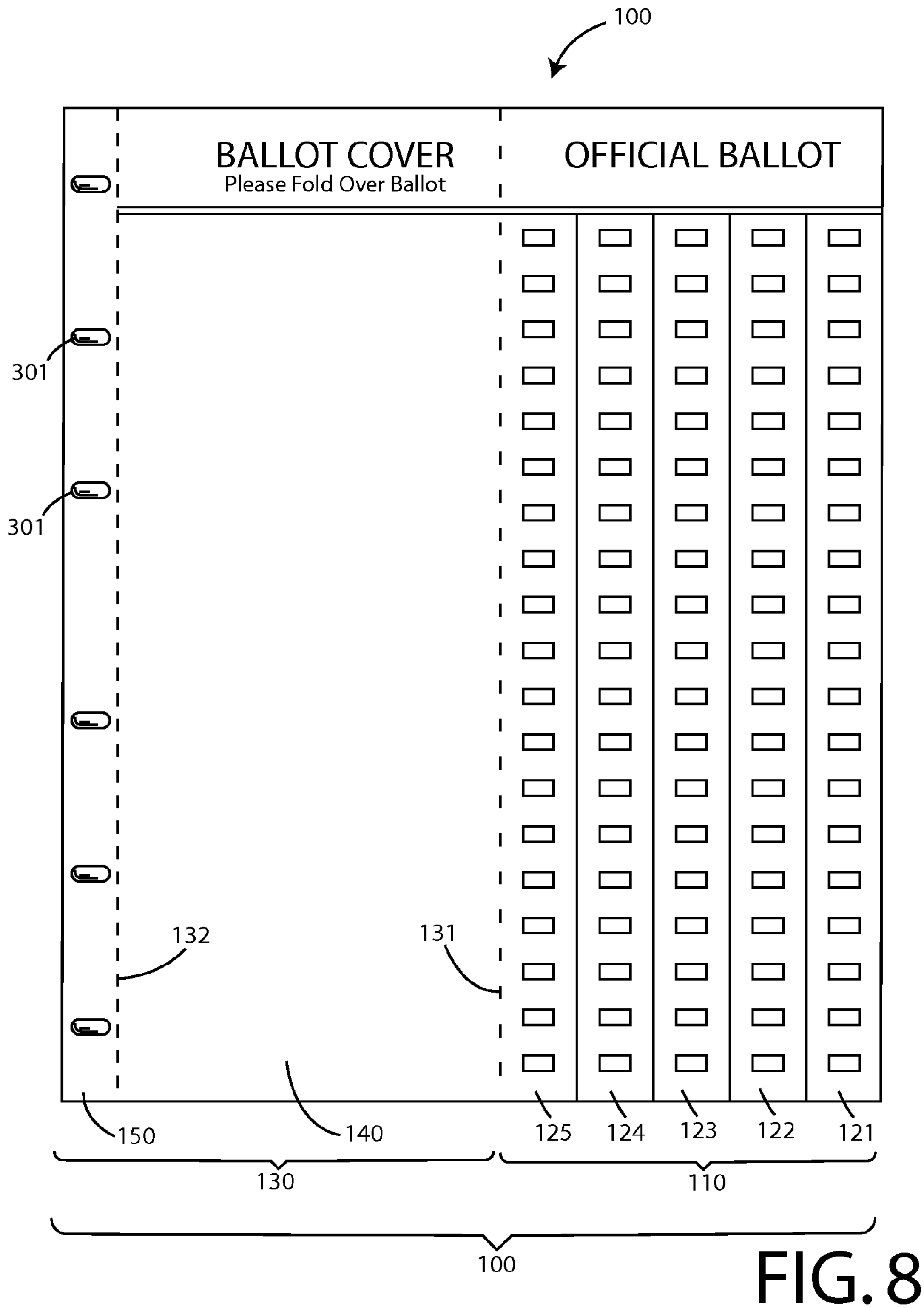
FIG. 8 is a top plan view of the backing assembly 100 used in the preferred integrated ballot assembly 10.

FIG. 8 is a top plan view of the backing assembly 100 used in the preferred integrated ballot assembly 10 of FIG. 6. FIGS. 9-13 illustrate the use of the ballot assembly 10 that is build upon backing assembly 100 of FIG. 8, as the voting information sheets 221-225 are turned, page by page, during the voting process, to align different ballot pointer indicia (the arrows) corresponding to particular voting options with the markable voting response locations of the underlying backing assembly's ballot card 100.

Figure 9:
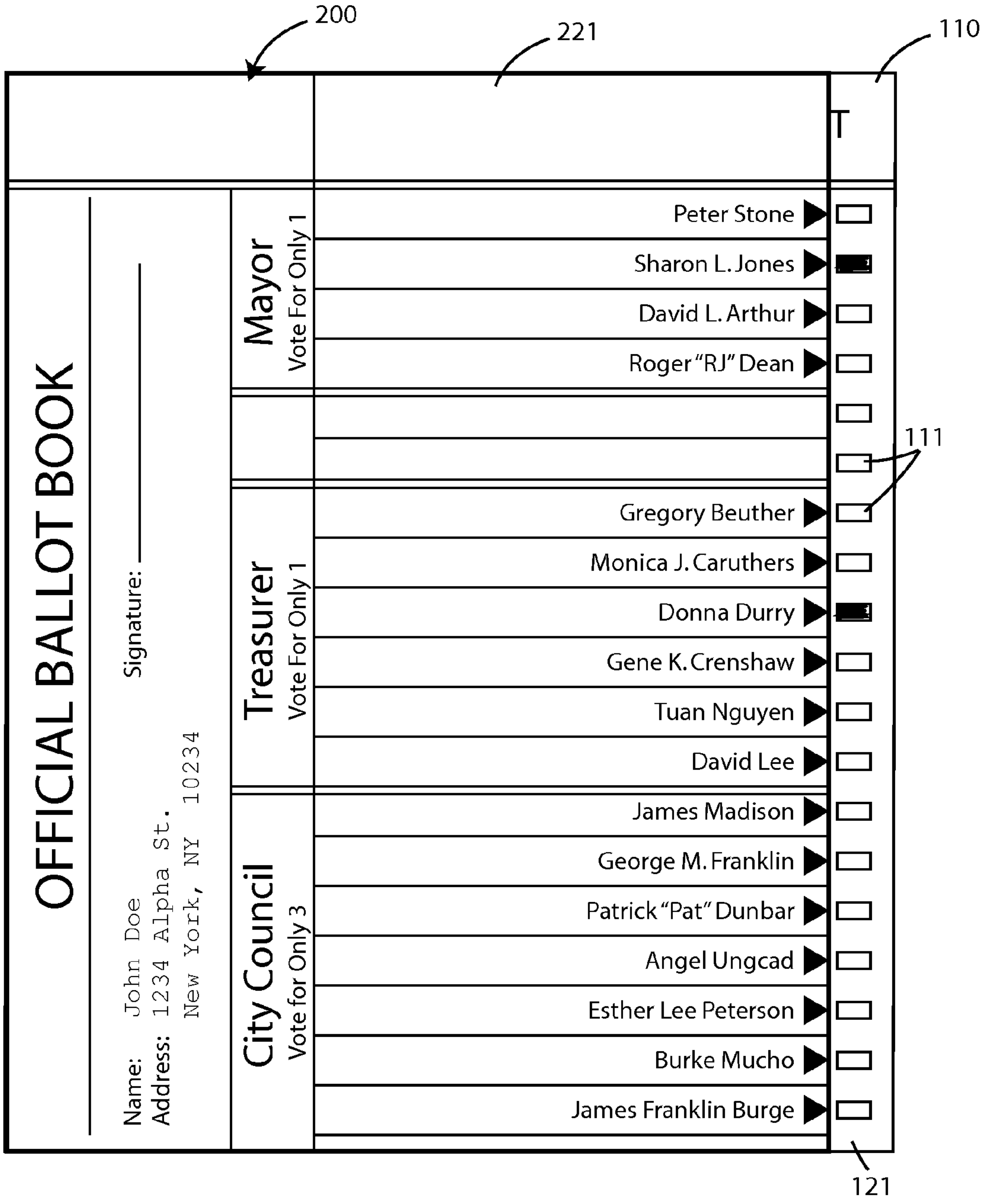
FIG. 9 is a top plan view of the integrated ballot assembly 10 with the booklet's first page 221 lined up with the ballot card's first voting column 121.
Figure 10:
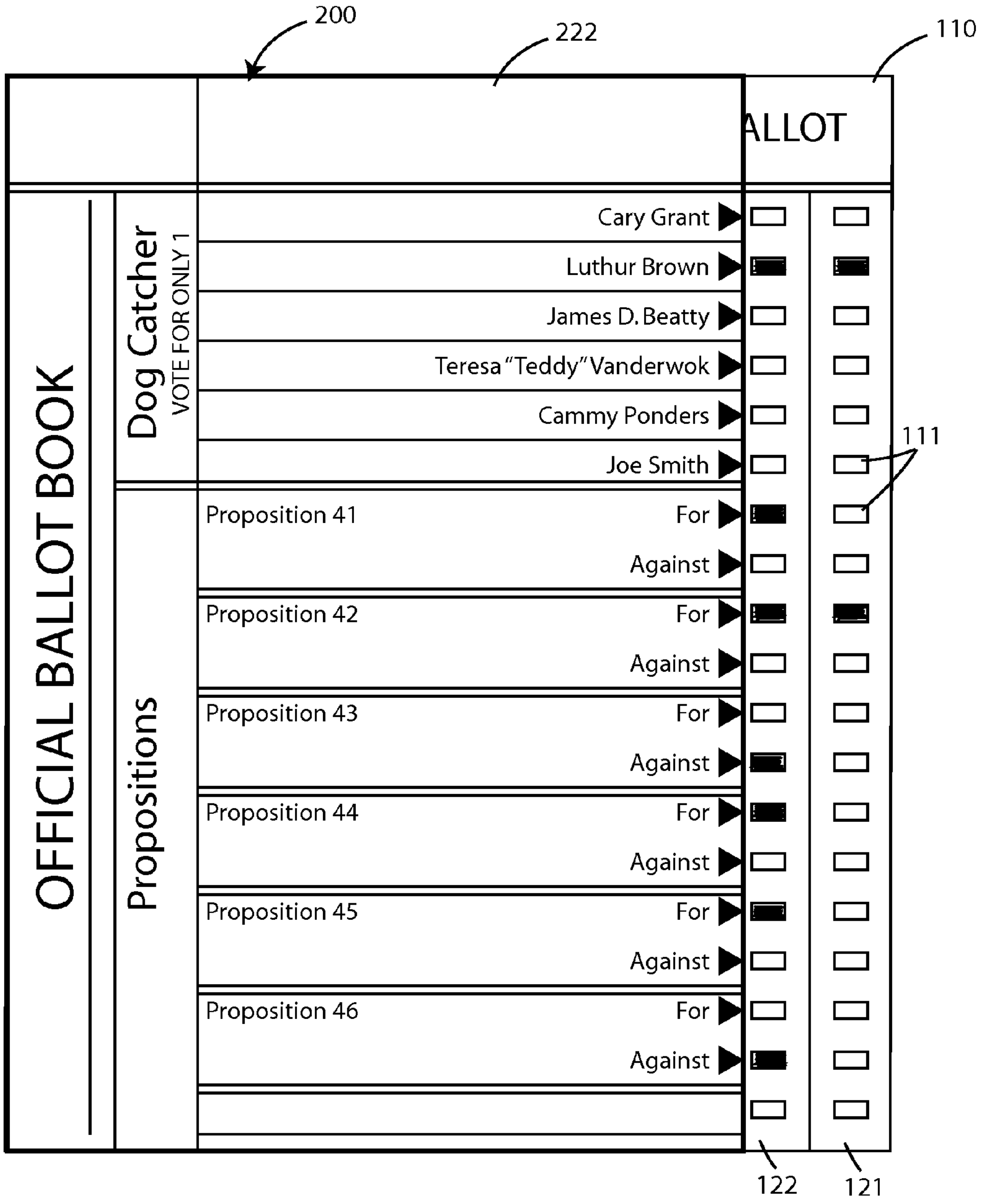
FIG. 10 is a top plan view of the integrated ballot assembly 10 with the booklet's second page 222 lined up with the ballot card's first voting column 122.
Figure 11:
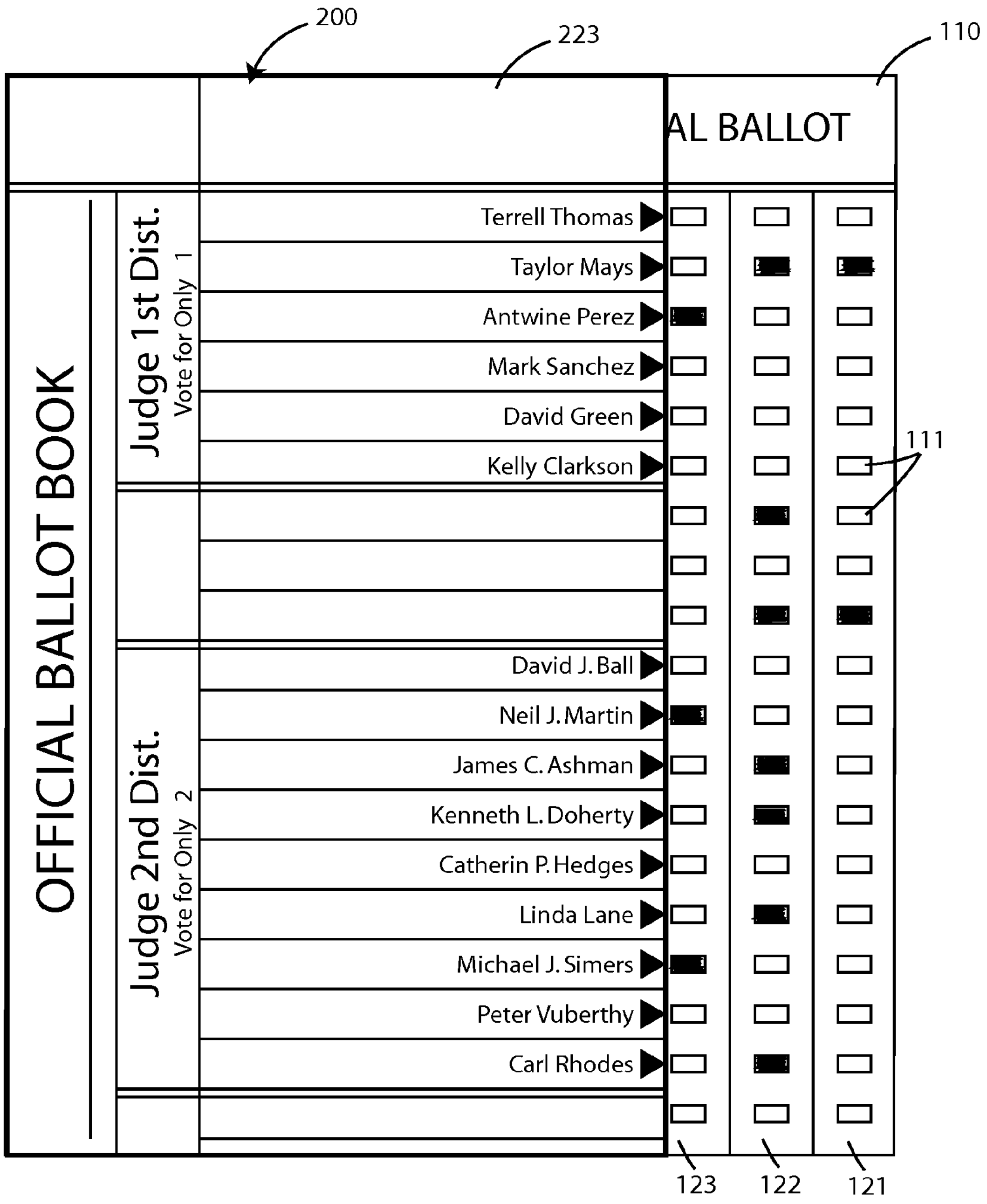
FIG. 11 is a top plan view of the integrated ballot assembly 10 with the booklet's third page 223 lined up with the ballot card's third voting column 123.
Figure 12:
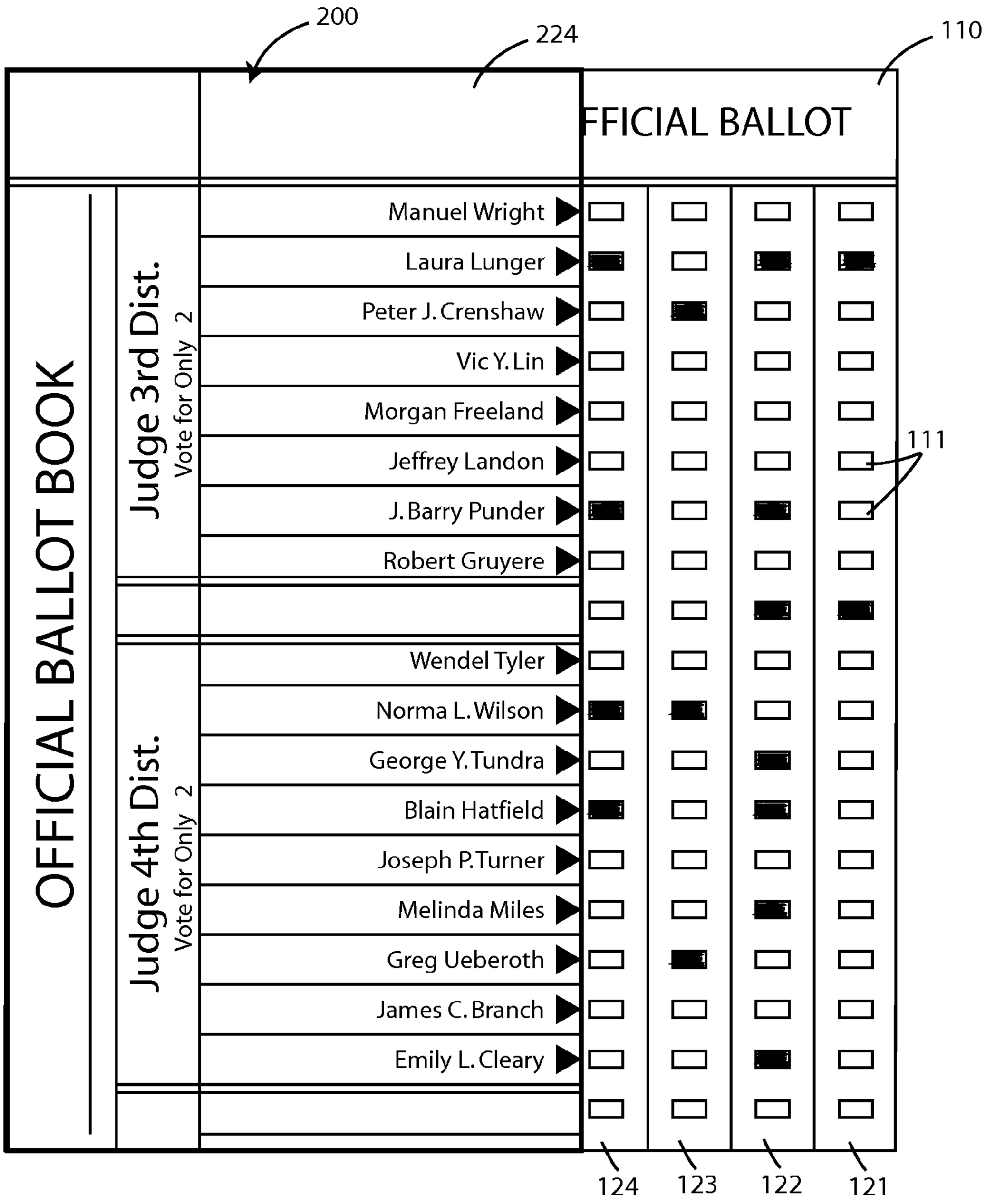
FIG. 12 is a top plan view of the integrated ballot assembly 10 with the booklet's fourth page 224 lined up with the ballot card's fourth voting column 124.
Figure 13:
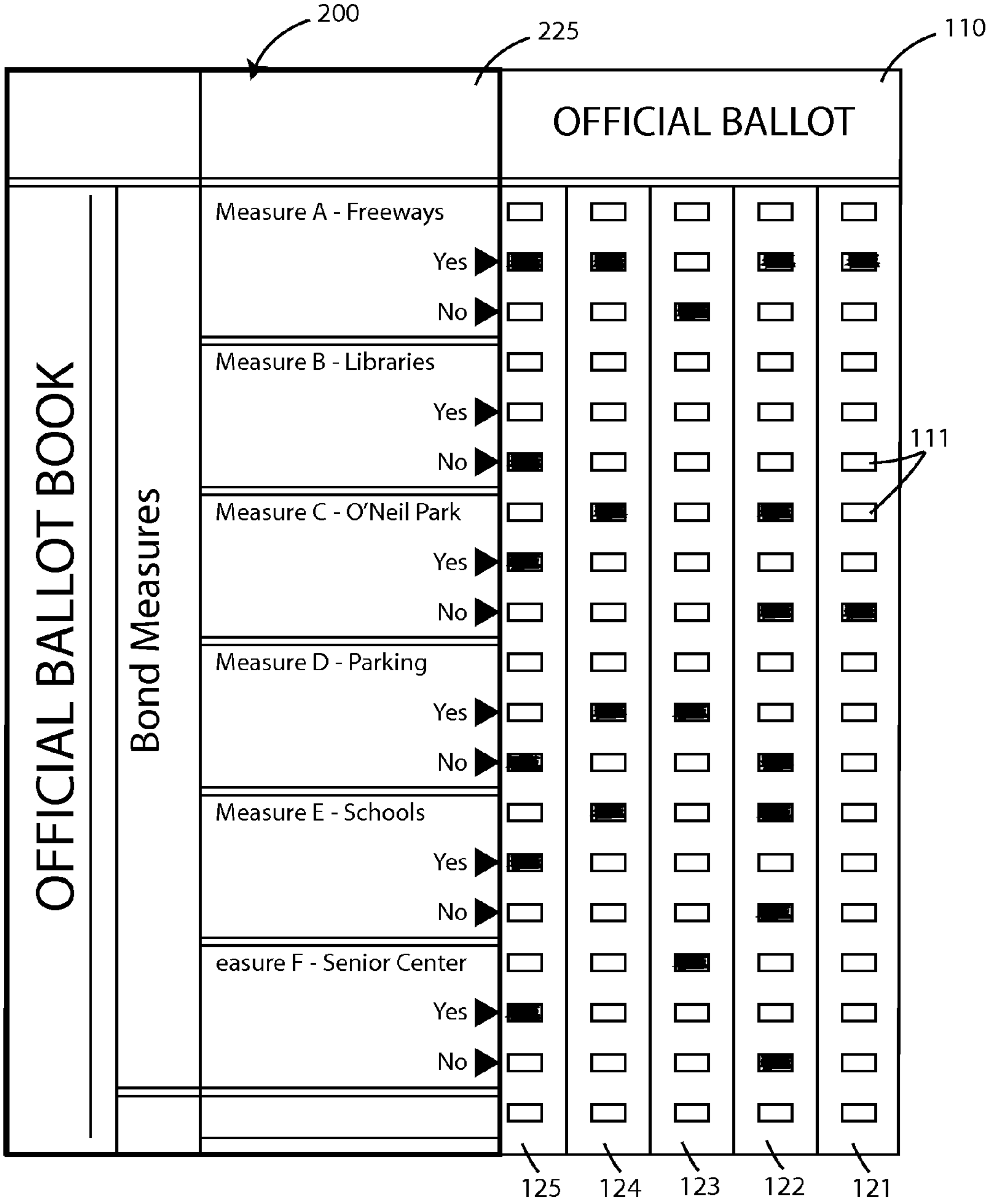
FIG. 13 is a top plan view of the integrated ballot assembly 10 with the booklet's fifth page 225 lined up with the ballot card's fifth voting column 125.

In detail, FIG. 9 is a top plan view of the integrated ballot assembly 10 with the booklet's first page 221 lined up with the ballot card's first voting column 121; FIG. 10 is a top plan view of the integrated ballot assembly 10 with the booklet's second page 222 lined up with the ballot card's first voting column 122; FIG. 11 is a top plan view of the integrated ballot assembly 10 with the booklet's third page 223 lined up with the ballot card's third voting column 123; FIG. 12 is a top plan view of the integrated ballot assembly 10 with the booklet's fourth page 224 lined up with the ballot card's fourth voting column 124; and FIG. 13 is a top plan view of the integrated ballot assembly 10 with the booklet's fifth page 225 lined up with the ballot card's fifth voting column 125.

Figure 1:
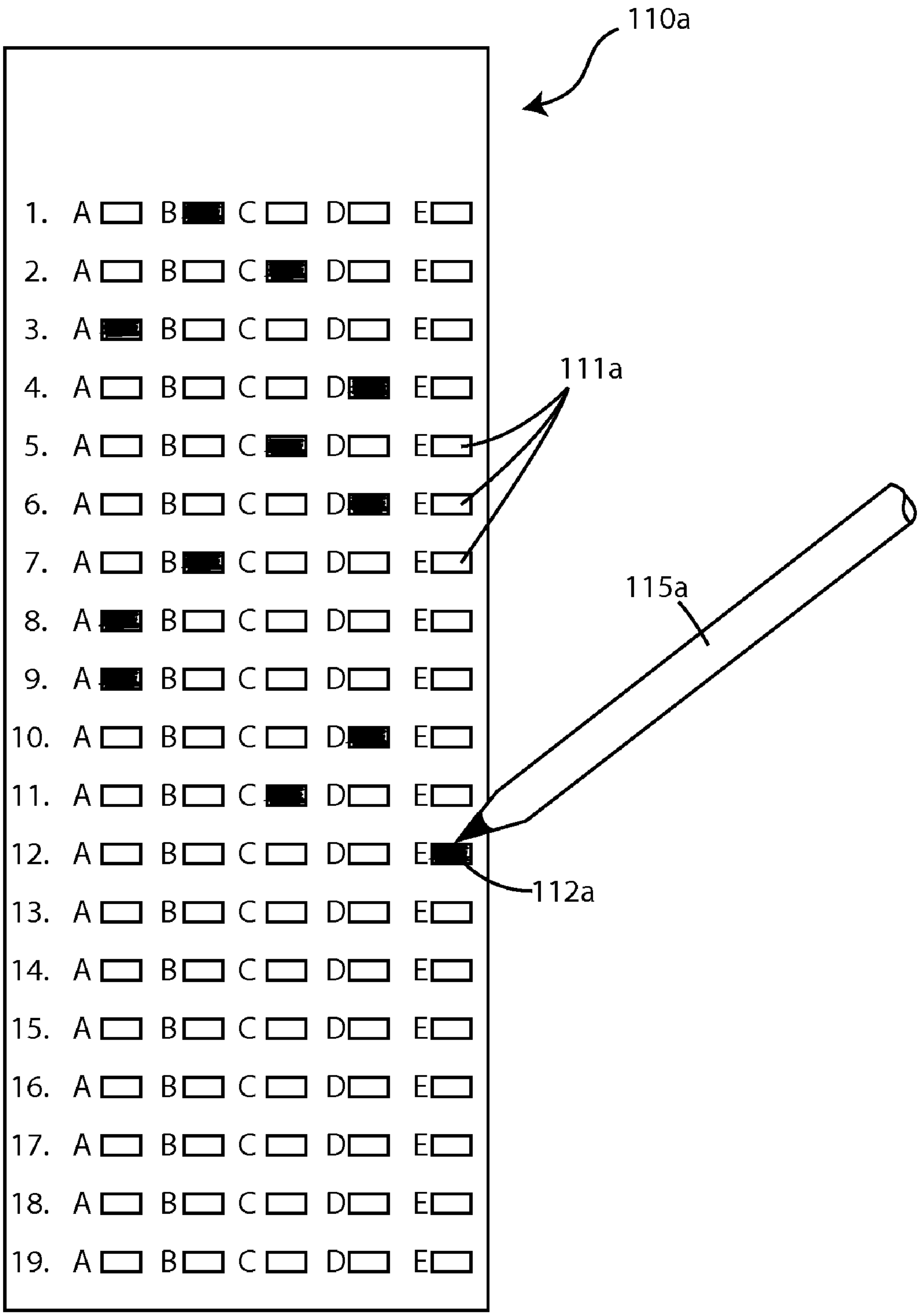
FIG. 1 PRIOR ART
FIG. 1 shows a ballot card 110*a* that has a number of rectangular voting response locations 111*a* that can be manipulated by the voter to produce marks 112*a* and then read by a machine (not shown)
Figure 2:
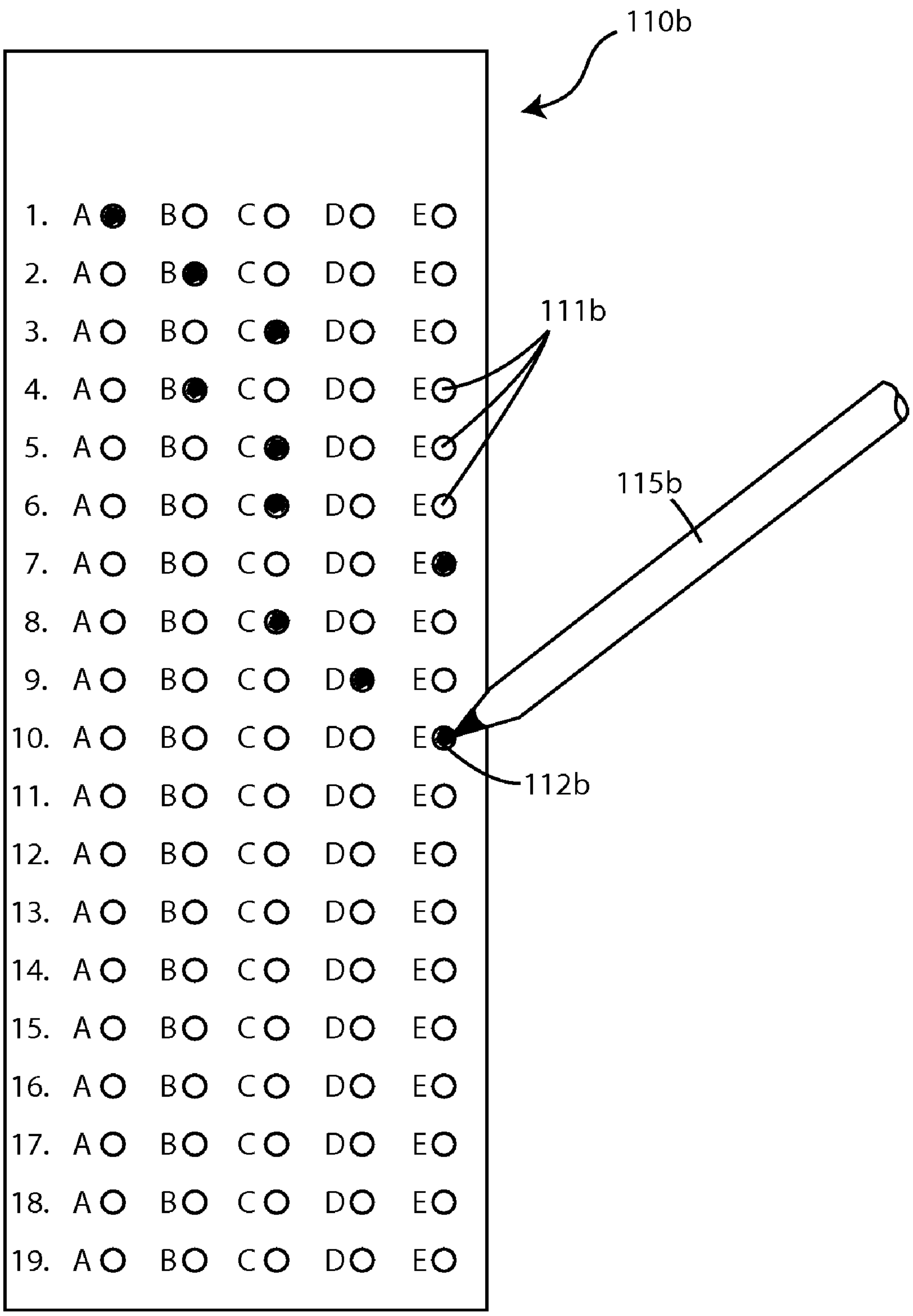
FIG. 2 PRIOR ART
FIG. 2 shows another ballot card 110*b* wherein the voter makes marks 112*b* in voting areas 111*b* that are circular, rather than rectangular.
Figure 3:
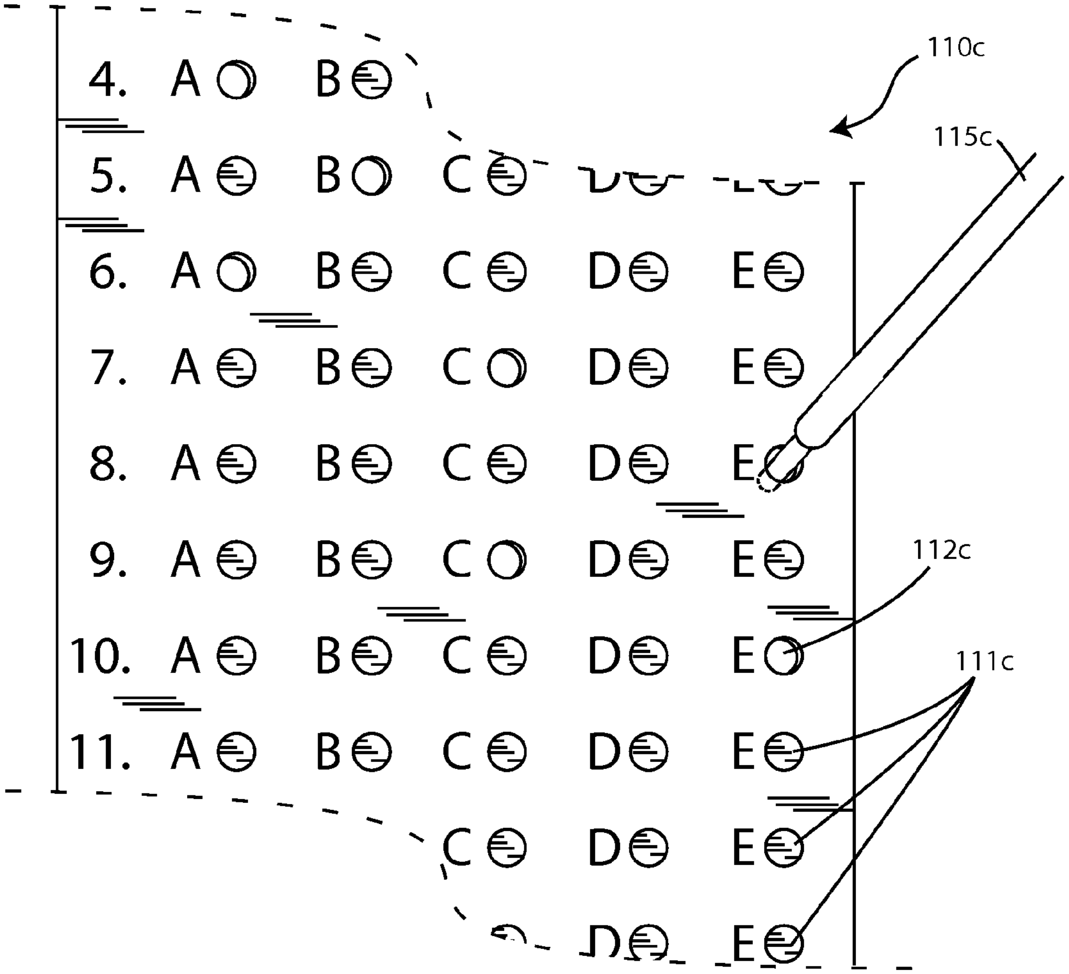
FIG. 3 PRIOR ART
FIG. 3 shows another ballot where the voter marks the ballot by using a stylus 115*c* to punch out a perforated disk 111*c* and leave behind a machine readable aperture 112*c;*

At each of the steps associated with FIGS. 9-3, the voter marks the desired voting response locations 111, e.g. with a no. 2 pencil mark as shown, or with any other suitable marking means.

The voting information sheets 221-225 could be provided as "tear-off" sheets, but in the preferred embodiment, the sheets 221-225 are simply folded over, to the left, to reveal a next lower voting information sheet. That way, the integrity of the ballot book 200 is maintained for the voter's records.

Figure 14:
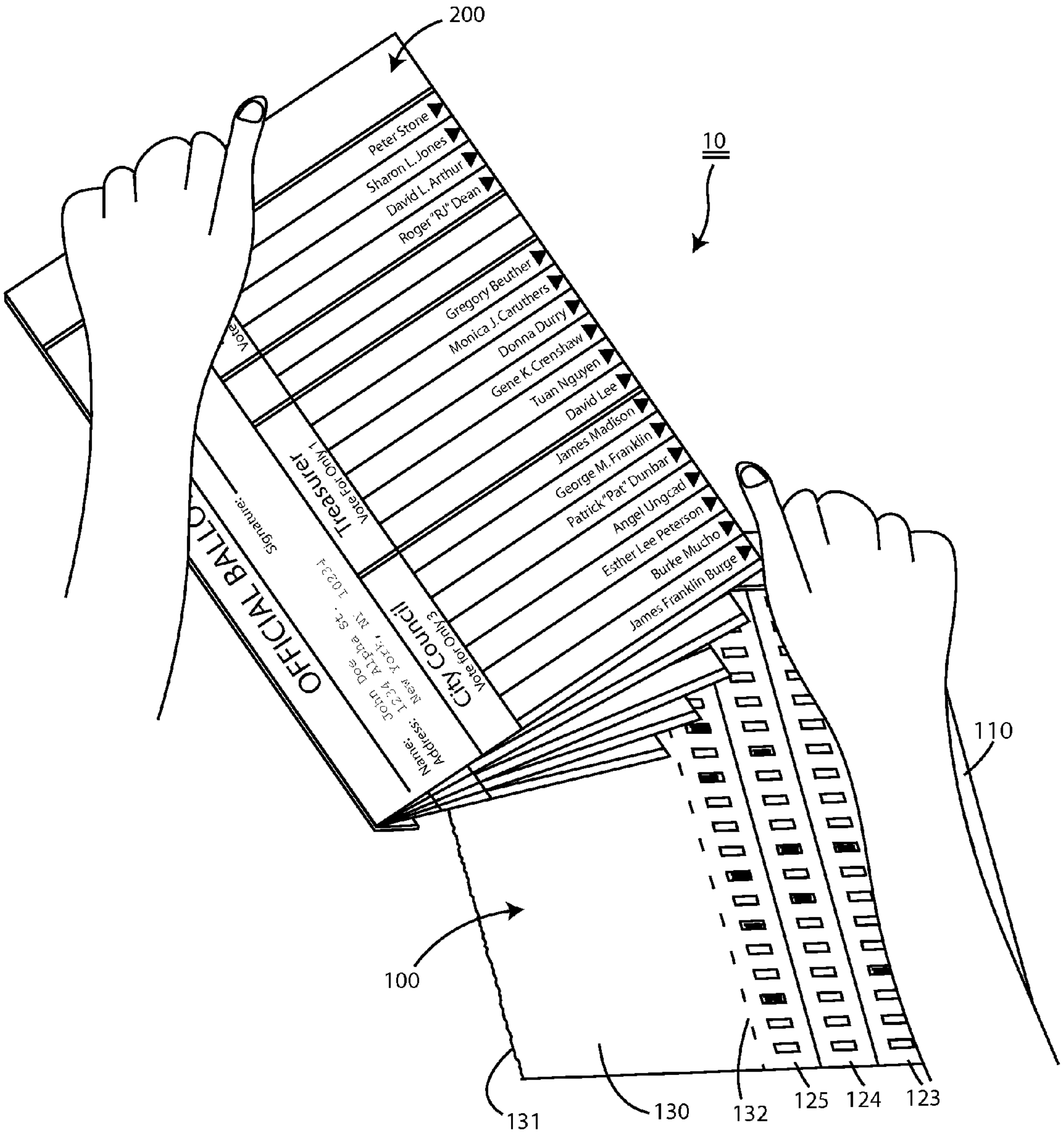
FIG. 14 shows the backing assembly 100 (ballot card 110 and covering portion 140) being separated from the booklet 200 along the second perforation line 132.

FIG. 14 shows most of the backing assembly 100 (here the ballot card 110 and covering portion 140) being separated from the booklet 200 and the mounting portion 150 of the backing assembly along the second perforation line 132. After this tear-off step, the article appears as shown in FIG. 15.

Figure 15:
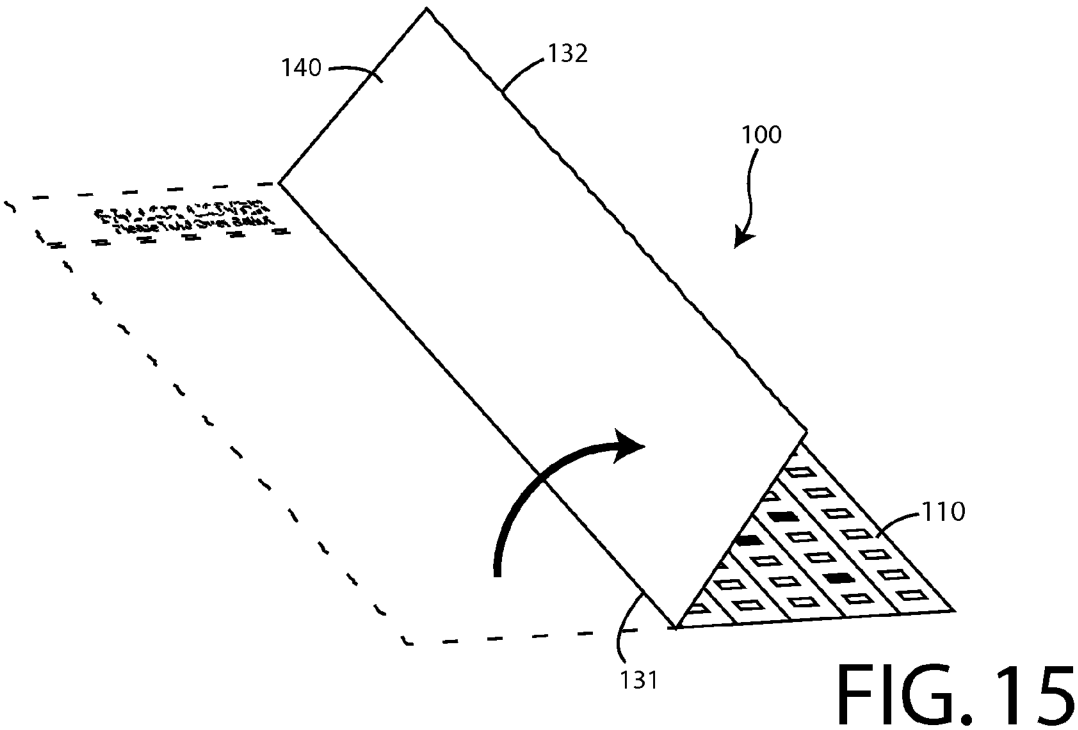
FIG. 15 shows the covering portion 140 being folded over the ballot card 110 along the first perforation line 131.
Figure 16:
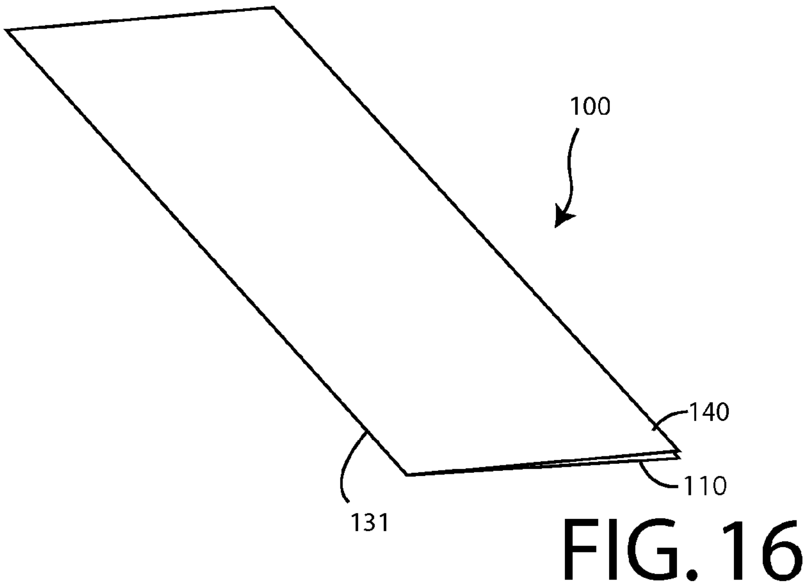
FIG. 16 shows the covering portion 140 covering the ballot card 110.

FIG. 15 shows the covering portion 140 being folded over the completed ballot card 110 along the first perforation line 131. And, FIG. 16 shows the covering portion 140 completely covering the ballot card 110, ready for mailing for handling to personnel at a polling station.

Figure 17:
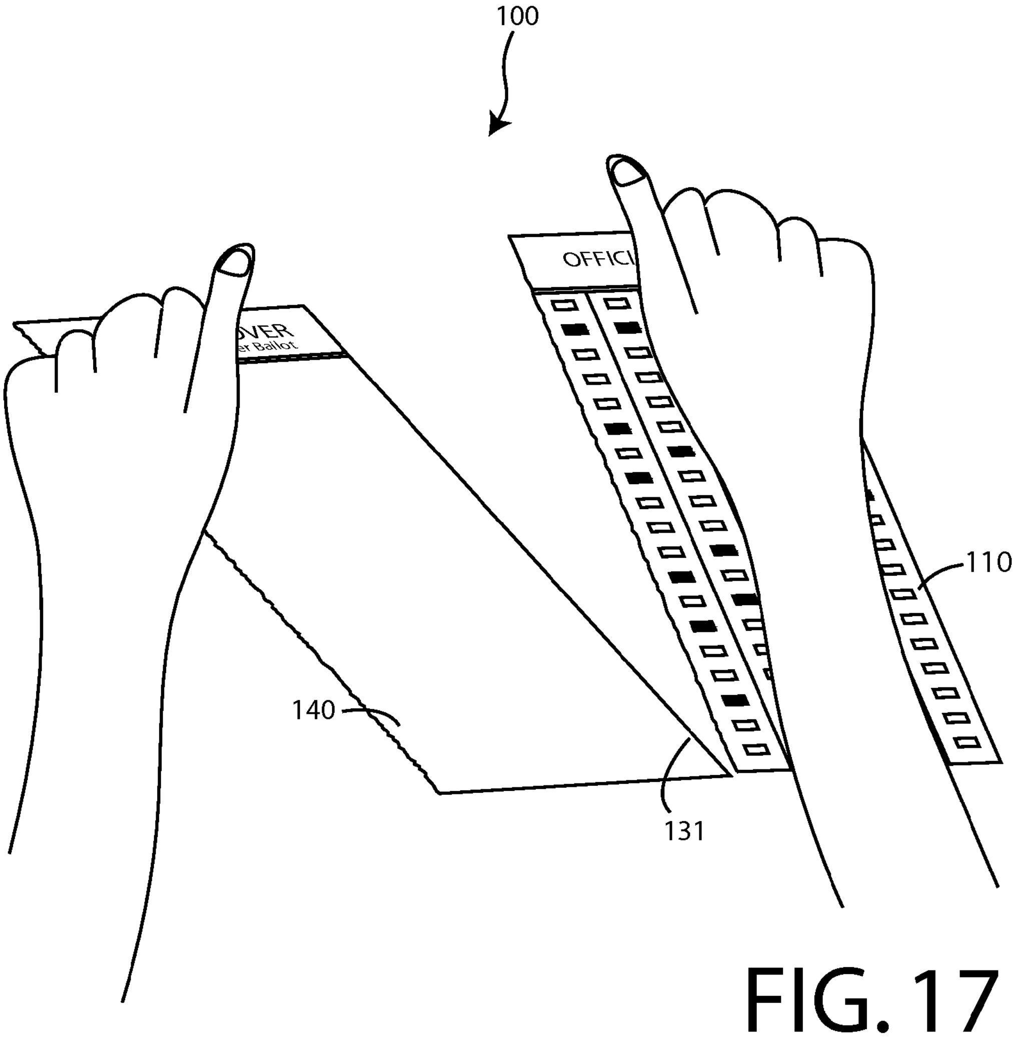
FIG. 17 shows the ballot card 110 being separated from the covering portion 140 for tabulation in a suitable reader.

FIG. 17 shows the completed ballot card 110 being separated from the covering portion 140 for tabulation in a suitable reader.

Figure 18:
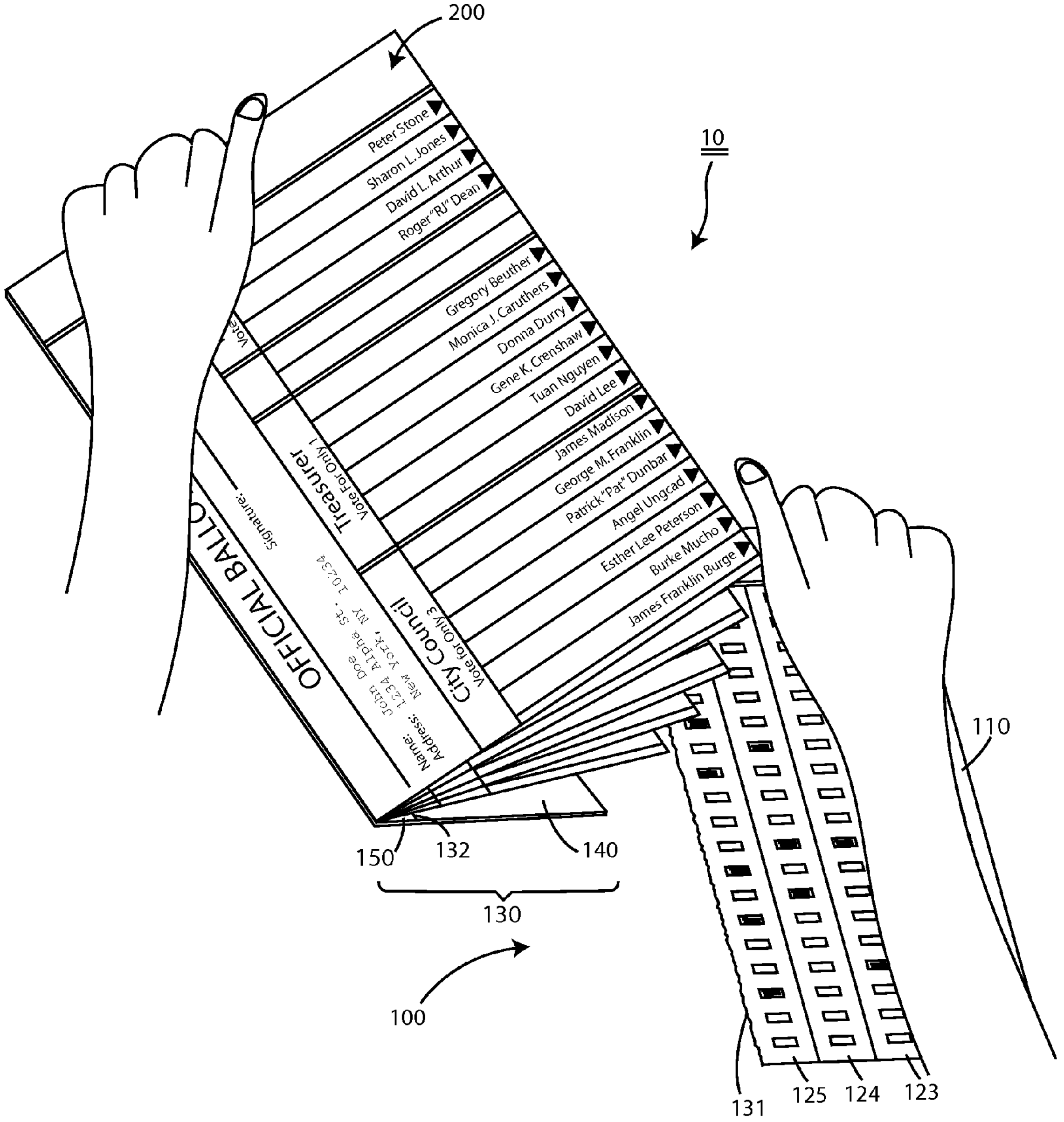
FIG. 18 shows the ballot card 110 being removed directly from the planar support card 130 and attached ballot book 200.

FIG. 18 shows an alternative tear-off approach, as compared with FIG. 14, wherein the backing assembly's ballot card 110 is removed directly from the backing assembly's planar support card 130 and attached ballot book 200. If the covering portion 140 is not required, than the second perforated line 132 could be omitted such that the ballot card 110 is inherently separated from the remainder of the ballot assembly 10 without being coupled to an attached covering portion.

Figure 19:
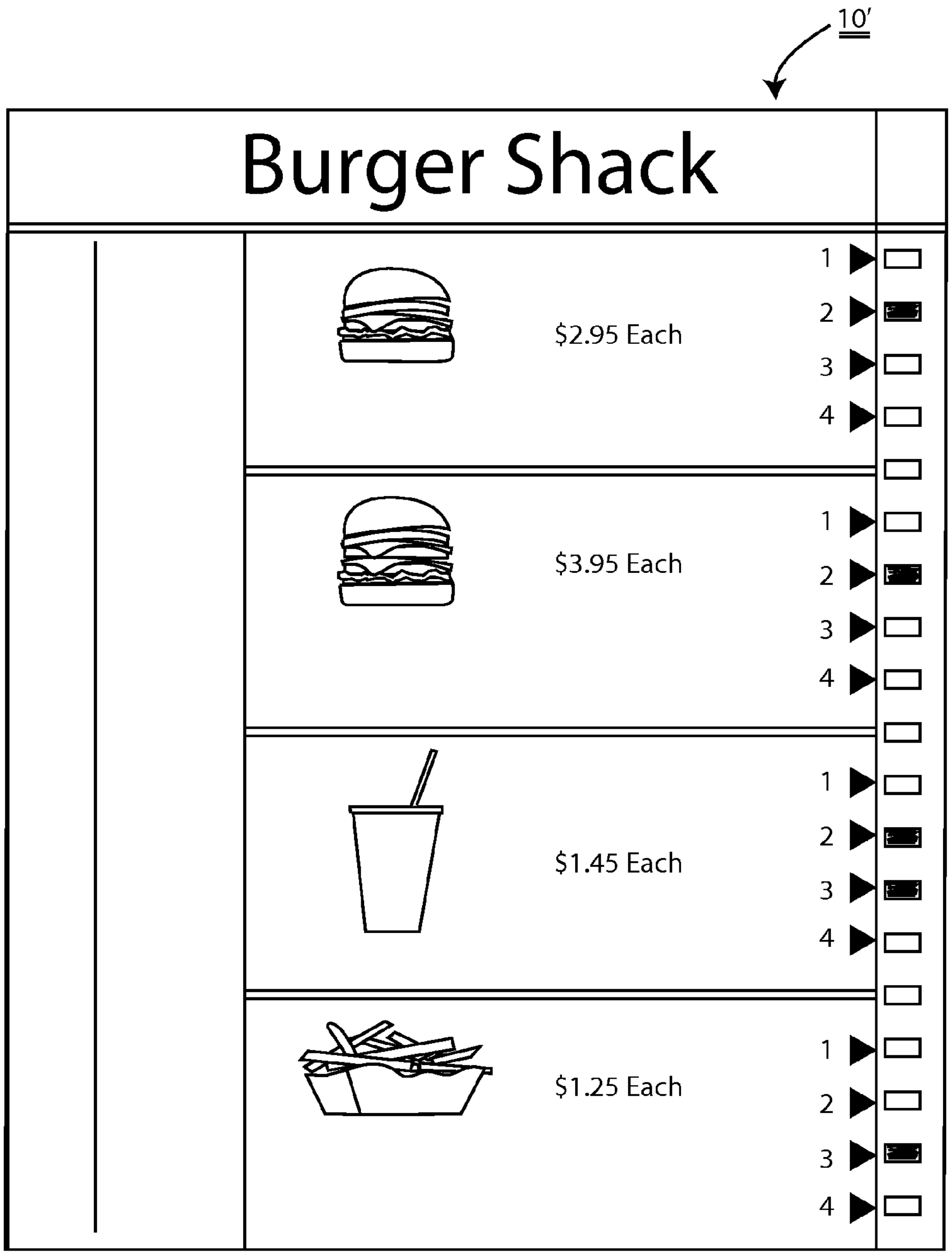
FIG. 19 shows an alternative embodiment of an integrated ballot assembly 10' having graphical indicia and suitable for use in a restaurant ordering environment.

FIG. 19 shows an integrated ballot assembly 10' according to an alternative embodiment. Here, the primary difference is that the informative indicia is primarily graphical, rather than textual, and the indicia shown relates to purchasing food or beverage at a restaurant rather than to a governmental election. In this particular case, the purchaser has selected two small burgers, two large burgers, five drinks (2+3), and three order of fries. In actual use, different food groups would likely be displayed on different voter information sheets, as with the first embodiment. An integrated ballot assembly 10' beneficially reduces error in the workplace and quite literally eliminates the need for both parties to speak the same language. Many other embodiments are possible.

Although the invention has been discussed with reference to specific embodiments, it will be apparent that the concept can be otherwise embodied to achieve the advantages discussed.

The invention claimed is:

1. An integrated ballot assembly comprising:

a backing assembly including, a planar support card;

a machine-readable ballot card that is formed coplanar with the planar support card, the machine-readable ballot card having a plurality of voting columns that are arranged from right to left in a sequence of successively leftward voting columns and that each contain a plurality of markable voting response locations; and a first perforated line that foldably and releasably connects the machine-readable ballot card to a right edge of the planar support card;

a ballot book comprising a plurality of voting information sheets that are arranged from top to bottom in a stack of successively lower voting information sheets, each voting information sheet having a left edge region, a right edge region, and a width, and means for connecting the ballot book to a top surface of the planar support card with its voter information sheets overlapping one another and the machine-readable ballot card, each voting information sheet carrying informative indicia that describes available voting options and corresponding ballot pointer indicia located at or near its right edge region, the width of the successively lower voting information sheets being successively narrower, each successively lower voting information sheet extending beyond the first perforated line and overlapping the machine-readable ballot card, the right edge region of each successively lower voting information sheet corresponding to and being aligned adjacent to a different and successively leftward one of the voting columns of the machine-readable ballot card, the ballot pointer indicia at or near the right edge of each successively lower voting information sheet visually correlating individual ones of the available voting options described by the informative indicia on that particular sheet with individual ones of the markable voting response locations in the corresponding voting column of the ballot card, the voting information sheets being moveable one after the other, from top to bottom, to expose each successively lower voting information sheet, available voting options, and ballot pointer indicia, and the corresponding successively leftward voting column, and the first perforated line holding the ballot card relative to the planar support card and thereby relative to the ballot book, the first perforated line holding the ballot card's markable voting response locations in alignment with the ballot book's corresponding ballot pointer indicia during marking, and the first perforated line releasing the ballot card for tabulation after marking.

2. The integrated ballot assembly of claim 1 wherein the planar support card comprises:

a mounting portion;

a covering portion; and a second perforated line that releasably connects the covering portion to a right edge of the mounting portion, the ballot book being connected to a top surface of the mounting portion, and the second perforated line holding the covering portion and ballot card connected thereto by the first perforated line during marking, and releasing the covering portion and ballot card connected thereto by the first perforated line after marking, the covering portion being foldable over and also separable from the ballot card about the first perforated line after marking.

3. The integrated ballot assembly of claim 1 wherein each markable voter response location designates an area within which a voter may make a voting response location by applying a mark to a surface of the ballot card.

4. The integrated ballot assembly of claim 1 wherein each markable voter response location designates an area within which a voter may make a voting response location by removing a portion of the ballot card.

5. The integrated ballot assembly of claim 4 wherein the designated area is pre-punched.

6. The integrated ballot assembly of claim 1 wherein the ballot pointer indicia comprises printed arrows that are located at or near the right edge region of the voting information sheets.

7. The integrated ballot assembly of claim 1 wherein the ballot pointer indicia comprises apertures located at or near the right edge region of the voting information sheets.

8. The integrated ballot assembly of claim 1 wherein the informative indicia that describes the available voting options is textual.

9. The integrated ballot assembly of claim 8 wherein the informative indicia that is textual relates to voting in a governmental election.

10. The integrated ballot assembly of claim 1 wherein the informative indicia that describes the available voting options is graphical.

11. The integrated ballot assembly of claim 10 wherein the informative indicia that is graphical relates to purchasing food or beverage in a restaurant.

12. The integrated ballot assembly of claim 1 wherein the means for connecting the ballot book to a top surface of the planar support card comprises glue.

13. The integrated ballot assembly of claim 1 wherein the means for connecting the ballot book to a top surface of the planar support card comprises a mechanical fastener.

14. The integrated ballot assembly of claim 13 wherein the mechanical fastener comprises staples.

15. An integrated ballot assembly comprising:

a backing assembly including, a planar support card having a mounting portion and a covering portion;

a machine-readable ballot card that is formed coplanar with the planar support card, the machine-readable ballot card having a plurality of voting columns that are arranged from right to left in a sequence of successively leftward voting columns and that each contain a plurality of markable voting response locations;

a first perforated line that foldably and releasably connects the machine-readable ballot card to a right edge of the planar support card's covering portion, and a second perforated line that releasably connects the planar support card's covering portion to a right edge of the mounting portion;

a ballot book comprising a plurality of voting information sheets that are arranged from top to bottom in a stack of successively lower voting information sheets, each voting information sheet having a left edge region, a right edge region, and a width, and means for connecting the ballot book to a top surface of the planar support card's mounting portion with its voter information sheets overlapping one another and the machine-readable ballot card, each voting information sheet carrying informative indicia that describes available voting options and corresponding ballot pointer indicia located at or near its right edge region, the width of the successively lower voting information sheets being successively narrower, each successively lower voting information sheet extending beyond the first perforated line and overlapping the machine-readable ballot card, the right edge region of each successively lower voting information sheet corresponding to and being aligned adjacent to a different and successively leftward one of the voting columns of the machine-readable ballot card, the ballot pointer indicia at or near the right edge of each successively lower voting information sheet visually correlating individual ones of the available voting options described by the informative indicia on that particular sheet with individual ones of the markable voting response locations in the corresponding voting column of the ballot card, the voting information sheets being moveable one after the other, from top to bottom, to expose each successively lower voting information sheet, available voting options, and ballot pointer indicia, and the corresponding successively leftward voting column, and the first and second perforated lines holding the ballot card relative to the planar support card and thereby relative to the ballot book to keep the ballot card's markable voting response locations in alignment with the ballot book's corresponding ballot pointer indicia during marking, the second perforated line releasing the covering portion and ballot card connected thereto after marking, the first perforated line making the covering portion foldable over and also separable from the ballot card about the first perforated line after marking.

16. The integrated ballot assembly of claim 15 wherein each markable voter response location designates an area within which a voter may make a voting response location by applying a mark to a surface of the ballot card.

17. The integrated ballot assembly of claim 15 wherein each markable voter response location designates an area within which a voter may make a voting response location by removing a portion of the ballot card.

18. The integrated ballot assembly of claim 17 wherein the designated area is pre-punched.

19. The integrated ballot assembly of claim 15 wherein the ballot pointer indicia comprises printed arrows that are located at or near the right edge region of the voting information sheets.

20. The integrated ballot assembly of claim 15 wherein the ballot pointer indicia comprises apertures located at or near the right edge region of the voting information sheets.

21. The integrated ballot assembly of claim 15 wherein the informative indicia that describes the available voting options is textual.

22. The integrated ballot assembly of claim 21 wherein the informative indicia that is textual relates to voting in a governmental election.

23. The integrated ballot assembly of claim 15 wherein the informative indicia that describes the available voting options is graphical.

24. The integrated ballot assembly of claim 23 wherein the informative indicia that is graphical relates to purchasing food or beverage in a restaurant.

25. The integrated ballot assembly of claim 15 wherein the means for connecting the ballot book to a top surface of the planar support card comprises glue.

26. The integrated ballot assembly of claim 15 wherein the means for connecting the ballot book to a top surface of the planar support card comprises a mechanical fastener.

27. The integrated ballot assembly of claim 26 wherein the mechanical fastener comprises staples.

* * * * *